United States Patent
Wolf et al.

(10) Patent No.: US 9,203,327 B2
(45) Date of Patent: Dec. 1, 2015

(54) ACTIVATION OF A SYNCHRONOUS RECTIFIER

(75) Inventors: Gert Wolf, Affalterbach (DE); Paul Mehringer, Stuttgart (DE); Kurt Reutlinger, Stuttgart (DE); Gerhard Walter, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1180 days.

(21) Appl. No.: 13/120,619

(22) PCT Filed: Sep. 25, 2009

(86) PCT No.: PCT/EP2009/062415
§ 371 (c)(1),
(2), (4) Date: Jun. 8, 2011

(87) PCT Pub. No.: WO2010/034793
PCT Pub. Date: Apr. 1, 2010

(65) Prior Publication Data
US 2011/0235381 A1    Sep. 29, 2011

(30) Foreign Application Priority Data
Sep. 25, 2008   (DE) .......................... 10 2008 042 352

(51) Int. Cl.
*H02M 7/217* (2006.01)
*H02M 7/219* (2006.01)
*H02M 7/162* (2006.01)

(52) U.S. Cl.
CPC .............. *H02M 7/219* (2013.01); *H02M 7/162* (2013.01); *Y02B 70/1408* (2013.01)

(58) Field of Classification Search
CPC ...... H02M 7/155–7/1626; H02M 7/217–7/219
USPC .......................................... 363/127; 318/800
See application file for complete search history.

(56) References Cited

U.S. PATENT DOCUMENTS

| | | | |
|---|---|---|---|
| 5,255,175 A | 10/1993 | Uchino | |
| 5,274,317 A | 12/1993 | Utley et al. | |
| 5,773,964 A * | 6/1998 | Peter | 322/20 |
| 5,780,996 A * | 7/1998 | Kusase et al. | 322/28 |
| 5,793,167 A | 8/1998 | Liang et al. | |
| 7,253,590 B2 * | 8/2007 | Suzuki et al. | 322/20 |

(Continued)

FOREIGN PATENT DOCUMENTS

| | | |
|---|---|---|
| CN | 1287710 | 3/2001 |
| CN | 1383603 | 12/2002 |
| DE | 196 32 891 | 2/1998 |

(Continued)

*Primary Examiner* — Jessica Han
(74) *Attorney, Agent, or Firm* — Kenyon & Kenyon LLP

(57) ABSTRACT

A rectifier bridge circuit is described for rectifying the phase voltage generated by a generator, including a positive half-bridge having multiple rectifier elements and a negative half-bridge having multiple rectifier elements. The rectifier elements each have a controllable switch having a diode connected in parallel. A control circuit is provided for switching the switches on and off. The switch-on time $t_{switch\ on\ setpoint}$ and/or the switch-off time $t_{switch\ off\ setpoint}$ of the switch is/are computed based on a characteristic map or a mathematical function.

23 Claims, 8 Drawing Sheets

(56) References Cited

U.S. PATENT DOCUMENTS

| | | | |
|---|---|---|---|
| 8,203,317 B2 * | 6/2012 | Auer et al. | 322/28 |
| 2008/0130322 A1 * | 6/2008 | Artusi et al. | 363/21.01 |

FOREIGN PATENT DOCUMENTS

| | | |
|---|---|---|
| DE | 198 49 889 | 5/2000 |
| DE | 199 29 060 | 10/2000 |

* cited by examiner

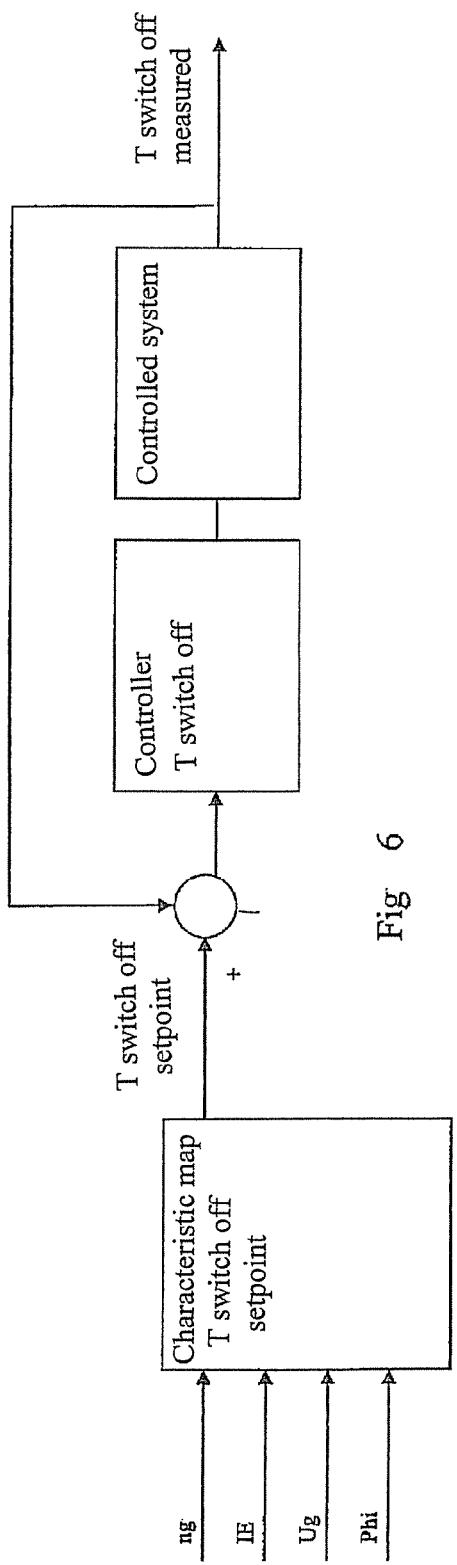
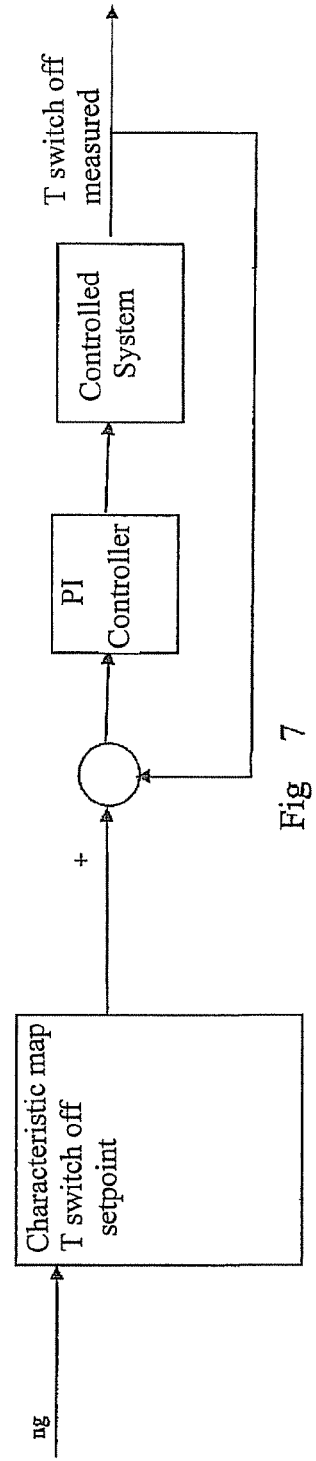
Fig 6
Fig 7

ACTIVATION OF A SYNCHRONOUS RECTIFIER

FIELD OF THE INVENTION

The present invention relates to a rectifier bridge circuit for rectifying the phase voltages generated by a generator for activating rectifier elements.

BACKGROUND INFORMATION

Rectifiers are used to convert an alternating voltage into a direct-current voltage. Known rectifiers are usually installed in bridge circuits having multiple diodes as rectifier elements. Common designs are so-called half-bridge or full-bridge rectifiers. In addition, motor vehicle alternating current generators generally include a bridge rectifier for supplying the vehicle electrical system with direct-current voltage. The rectifier has a power loss which is specified by the resistance of the diodes and the output current. This power loss may be reduced only slightly by using circuitry measures such as connecting multiple diodes for each phase in parallel, for example. It is therefore known to replace the rectifier diodes with active switches, for example MOSFET transistors, via which the power loss may be significantly reduced. However, the use of active switches requires activation of the switches synchronously with the phase frequency. The point in time at which the switches are switched on and off is particularly critical. Activation of the switches with the aid of a control device is relatively complicated and imprecise in the case of the known rectifiers.

SUMMARY OF THE INVENTION

An object of the exemplary embodiments and/or exemplary methods of the present invention, therefore, is to provide a rectifier bridge circuit having semiconductor switches which have a simple and robust evaluation electronics system, and a method for activating the switches of a rectifier bridge circuit which operates in a particularly simple and accurate manner and is functional in variable operating states.

This object is achieved according to the exemplary embodiments and/or exemplary methods of the present invention by the features described herein. Further embodiments of the present invention are the subject matter of the further description herein. The essential concept of the present invention is to compute switch-on time $t_{switch\ on}$ for the particular switches and/or switch-off time $t_{switch\ off}$ for the switch based on a characteristic map or a function. As input variables, the characteristic map or the function uses machine-specific parameters such as rotational speed ng, or rotational speed ng and excitation current IE, or rotational speed ng and excitation current IE and generator voltage UG, or rotational speed ng and excitation current IE and rotational angle phi of the rotor. The changes in rotational speed and/or excitation current and/or generator voltage and/or rotational angle of the rotor may be used as additional input parameters.

Of course, other input parameters which are proportional to the stated variables may be used instead of the stated variables. For example, the frequency of the alternating voltage of the phases of the generator, or the time intervals between the switch-on times for various phases, may be used instead of generator rotational speed ng. The generator current or the current in a phase may be used instead of the excitation current.

For controlling the switches, a device for generating control signals is provided which is supplied with the phase voltages of the generator, the rotational speed, and/or the excitation current, and/or the generator voltage, and/or the rotational angle of the rotor, and which on the basis thereof generates the control signals. The switch-on condition of the switches is ascertained by measuring the forward voltage of the diode parallel to the switch. This results in commutation of the phase in the optimal "natural" commutation time for the rectifier elements. The switch-off time of the switches may then be based on this point in time, as desired. The control of the switch-on time as a function of the forward voltage has the significant advantage that the control may be provided in a particularly simple and cost-effective manner using a logic circuit.

The exemplary embodiments and/or exemplary methods of the present invention are explained as an example in greater detail below, with reference to the appended drawings.

BRIEF DESCRIPTION OF THE DRAWINGS

FIG. 6 shows regulation via t switch off.

FIG. 7 shows regulation via t switch off and a simplified characteristic map.

FIG. 8 shows regulation via t switch on.

DETAILED DESCRIPTION

Figure 1A:
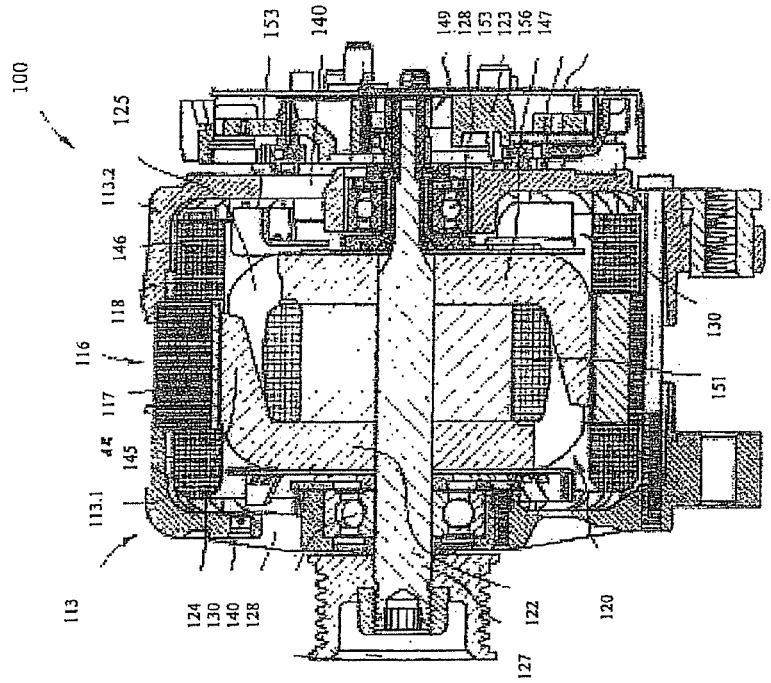
FIG. 1a shows a longitudinal section of an engine alternating current generator for motor vehicles having a claw pole rotor.

FIG. 1a illustrates a sectional view of an engine alternating current generator 100 for motor vehicles. This engine alternating current generator has, among other elements, a two-part housing 113 composed of a first end shield 113.1 and a second end shield 113.2. End shield 113.1 and end shield 113.2 accommodate a stator 116 having an annular ring-shaped core stack 117 which has inwardly open and axially extending grooves 119 in which a stator winding 118 is inserted. The radially inwardly directed surface of ring-shaped stator 116 encloses an electromagnetically excited rotor 120 which is designed as a claw pole rotor. Rotor 120 is composed, among other elements, of two claw pole plates 122 and 123, on the outer periphery of which claw pole fingers 124 and 125 are situated which in each case extend in the axial direction. Both claw pole plates 122 and 123 are situated in rotor 120 in such a way that their claw pole fingers 124, 125 which extend in the axial direction alternate with one another as north and south poles on the periphery of rotor 120.

This results in magnetically necessary claw pole interspaces between claw pole fingers 124 and 125 which are magnetized in opposite directions, and which extend at a slight inclination relative to the machine axis due to pole fingers 124 and 125 which taper toward their free ends. Permanent magnets for leakage flux compensation may be introduced in these claw pole interspaces. This course is referred to in a simplified manner as "axial" for the following description of the exemplary embodiments of the present invention and in the claims. Rotor 120 is rotatably mounted in each of end shields 113.1 and 113.2 with the aid of a shaft 127 and one roller bearing 128 situated on each side of the rotor. The rotor has two axial end faces, on each of which a fan 130 is mounted. These fans 130 are essentially composed of a plate- or disk-shaped section from which fan blades emerge in a known manner.

These fans 130 are used to allow air exchange between the exterior and the interior of electric machine 100 via openings 140 in end shields 113.1 and 113.2. For this purpose, openings 140 are provided at the axial ends of end shields 113.1 and 113.2, via which the cooling air is drawn into the interior of electric machine 100 with the aid of fans 130. This cooling air is accelerated radially outward by the rotation of fans 130, so that it is able to pass through winding head 145 on the drive side and winding head 146 on the electronics side, which are permeable to cooling air. Winding heads 145, 146 are cooled by this effect. After passing through winding heads 145, 146 or flowing around these winding heads 145, 146, the cooling air follows a radially outward path through openings, not illustrated.

A protective cap 147 which protects various components from environmental influences is shown on the right side in FIG. 1a. This protective cap 147 covers, for example, a slip ring assembly 149 which supplies an excitation winding 151 with excitation current. A cooling element 153, which in this case acts as a cooling element for the controlled rectifier/inverter and for the control unit, is situated around this slip ring assembly 149. A connecting plate 156 is situated between end shield 113.2 and cooling element 153 which connects these winding connection wires to the connections of the control unit and of the rectifier/inverter.

Figure 1B:
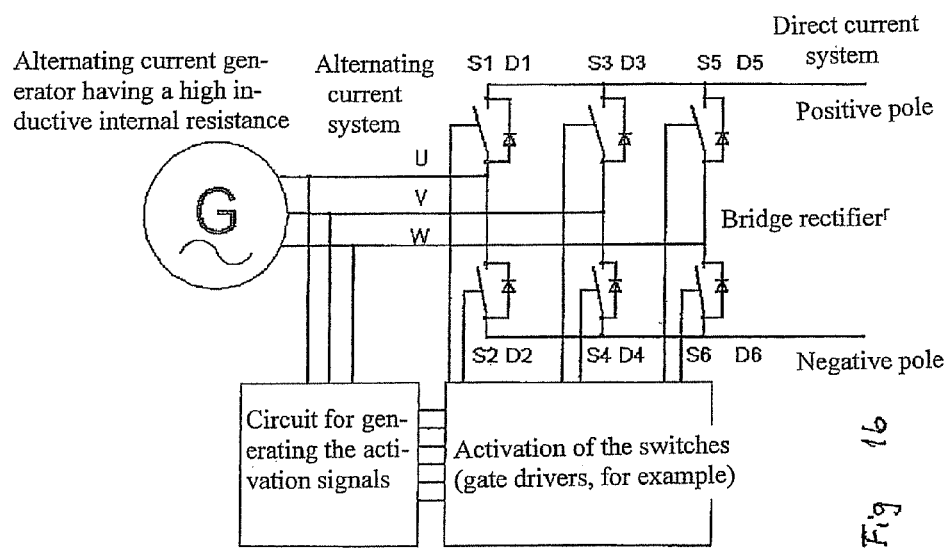
FIG. 1b shows the structure of a bridge rectifier having active switches.

FIG. 1b shows the structure of a bridge rectifier having active switches which may be used as the basis in considering the method according to the present invention. The descriptive text in the circuit is provided for better understanding. The voltage across at least one or at each of diodes D1-D6 is analyzed, for example using a comparator having a switching threshold of 3.3 volts, for example.

According to the exemplary embodiments and/or exemplary methods of the present invention, a control method for generating the control signals for a rectifier having active switching elements is described. These signals are obtained, without position sensors and without a high-precision analog circuit, by measuring the forward voltage across the diodes with minimal tolerances or by measuring the current. However, in this circuit system it is important that passive diodes are also present parallel to the active switches.

The method or the circuit is therefore particularly suited for rectifiers having active switches which already have these diodes in the semiconductor design, such as MOSFET transistors, for example. It is not necessary to introduce additional diodes for these rectifiers. The main objective is to provide synchronous rectification in a cost-effective and robust manner by simple generation of the control signals, thus reducing the rectifier losses. The exemplary embodiments and/or exemplary methods of the present invention provide an activation strategy which achieves robust activation and is functional in variable operating states, using a simple evaluation electronics system.

The switched-on condition of the active switches may be easily detected by analyzing the voltage across the inverse diode of the MOSFET. For a forward voltage of typically 0.7 V, reliable detection of the switched-on condition having a limiting value of 0.35 V, for example, is possible. However, this signal collapses as soon as the activation has been carried out, since the diode forward voltage is bridged by the RDS_on of the MOSFET. This is the basis for the gain in efficiency. In a prior invention it has been proposed to make the switch-off decision based on the phase voltages of a subsequent phase or by computation. This is considered to be problematic for the dynamics as the result of the rotational speed and the excitation current. It is important to generate a signal whose time width may be regulated by intentionally switching off prematurely in the hysteresis element.

Figure 2:
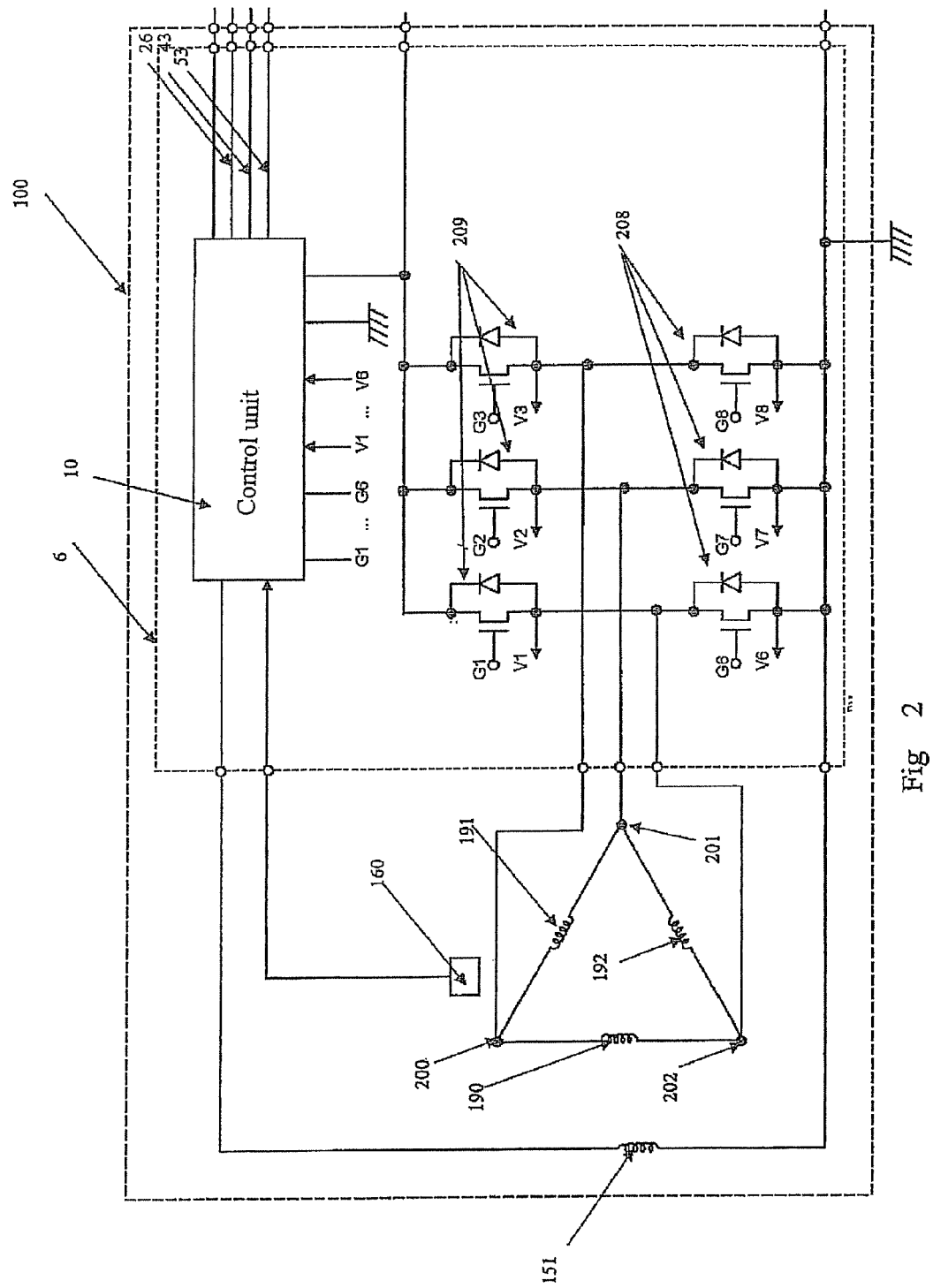
FIG. 2 shows a three-phase specific embodiment of the engine alternating current generator, connected in a triangle.

FIG. 2 illustrates, using a circuit diagram, an alternating current generator 100 having three phase-forming phase windings 190, 191, 192. The totality of all phase windings 190, 191, 192 forms stator winding 118. The three phase-forming phase windings 190, 191, 192 are connected to form a basic circuit in the form of a triangle, the connected windings in the corners of the triangle defining an angle of approximately 60° el. Rectifier/inverter bridge circuit 129 is connected at the connecting points of corners 200, 201, 202 of the triangle. The phase windings are connected as follows. Partial phase winding 190 is connected to partial phase winding 191 at connecting point 200. At its opposite end, phase winding 191 is connected to phase winding 192 at connecting point 201. At its opposite end, phase winding 192 is connected to phase winding 190 at connecting point 202. The connecting points may be axially located on or near winding head 146 on the electronics side in order to achieve the shortest possible connecting paths. For this purpose, the particular connecting wires of phase windings 190, 191, 192 of a connecting point 200, 201, 202 to be connected, which may exit into grooves 119, which are directly adjacent, in the circumferential direction.

Connecting points 200, 201, 202 of phase windings 190, 191, 192 are connected to a separate controlled bridge inverter-bridge rectifier 119 composed of three low-side switches 208 and five high-side switches 209. The number of low-side switches corresponds to the number of high-side switches, and corresponds to the number of phase-forming phase windings. The low-side switches and high-side switches may be formed by metal oxide semiconductor (MOS) transistors, bipolar transistors, insulated gate bipolar transistors (IGPT), or similar switching components. When bipolar transistors or IGPTs are used, junction diodes are each connected in parallel to the high-side switches and the low-side switches, so that the direct current flow directions of the diodes in each case are correspondingly reversed with respect to the direct current flow directions of the switching components.

Power transistors, whose carriers are electrons, may be used as transistors of the high-side switches and low-side switches, since the power transistors reduce resistance losses and costs; i.e., n-channel MOS transistors are selected in all types of MOS transistors, npn transistors are selected in all types of bipolar transistors, or insulated gate npn transistors are selected in all types of IGPTs. A control unit which regulates the voltage of the generator by influencing the current through excitation winding 151 is connected in parallel on the direct current voltage side. The control unit may also have a connection to the rectifier in order to ascertain the frequency of the alternating voltage for the voltage induced by the phase-forming windings, and to ascertain therefrom the instantaneous rotational speed of the engine generator.

The control unit is optionally designed for receiving the rotor position signal, the signals from the communication connections, and a control signal. The control unit is also operated to generate gate voltages VG1-VG6 of the particular components, based on the received signals, thus supplying generated gate voltages VG1-VG6 to gate terminals G1-G6 of the switching elements in order to switchably control in each case a switched-on and a switched-off state of same.

Figure 3:
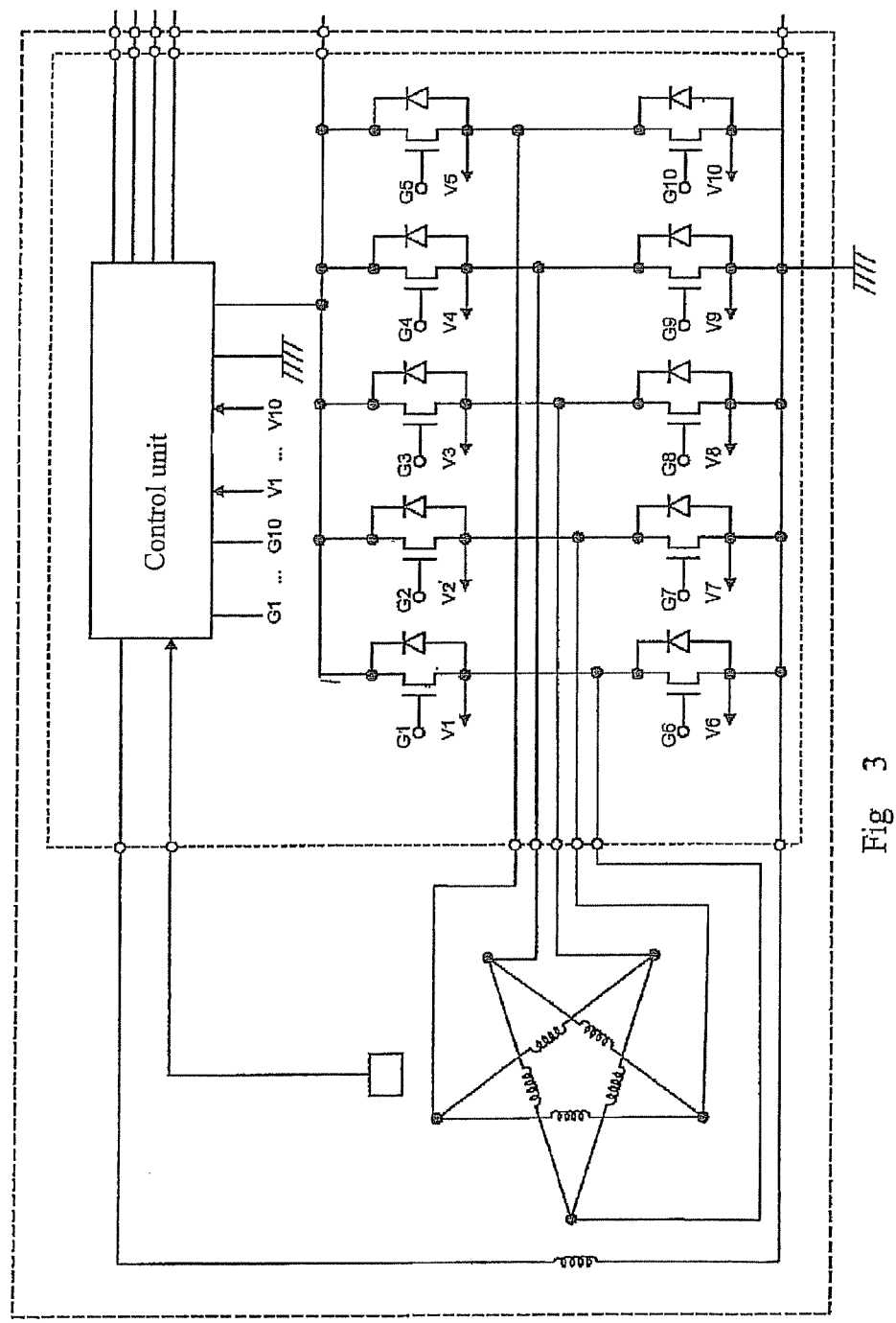
FIG. 3 shows a five-phase specific embodiment of the engine alternating current generator, connected in a five-pointed star.

FIG. 3 illustrates an alternating current generator 100 having five phase-forming phase windings 170, 171, 172, 173, 174, using a circuit diagram. The totality of all phase windings 170, 171, 172, 173, 174 forms stator winding 118. The five phase-forming phase windings 170, 171, 172, 173, 174 are connected to form a basic circuit in the form of a five-pointed star, also referred to as a pentagram, the windings connected at each point of the star defining an angle of approximately 36° el. Rectifier bridge circuit 129 is connected to the connecting points of points 180, 181, 182, 183, 184 of the five-pointed star. The phase windings are connected as follows.

Partial phase winding 170 is connected to partial phase winding 171 at connecting point 180. At its opposite end, phase winding 171 is connected to phase winding 172 at connecting point 181. At its opposite end, phase winding 172 is connected to phase winding 173 at connecting point 182. At its opposite end, partial phase winding 173 is connected to phase winding 174 at connecting point 183. At its opposite end, phase winding 174 is connected to phase winding 170 at connecting point 184. The connecting points may be axially located on or near winding head 146 on the electronics side in order to achieve the shortest possible connecting paths.

For this purpose, the particular connecting wires of phase windings 170, 171, 172, 173, 174 of a connecting point 180, 181, 182, 183, 184 to be connected, which may exit into grooves 119, which are directly adjacent, in the circumferential direction. Connecting points 180, 181, 182, 183, 184 of phase windings 170, 171, 172, 173, 174 are connected to a separate bridge rectifier/bridge inverter composed of five low-side switches and five high-side switches 159. The remaining design corresponds to that of FIG. 2. The voltage is measured via a diode, and the instantaneous rotational speed of the generator is ascertained therefrom. The vehicle electrical system is schematically illustrated by vehicle battery 30 and vehicle consumer 33.

Figure 4:
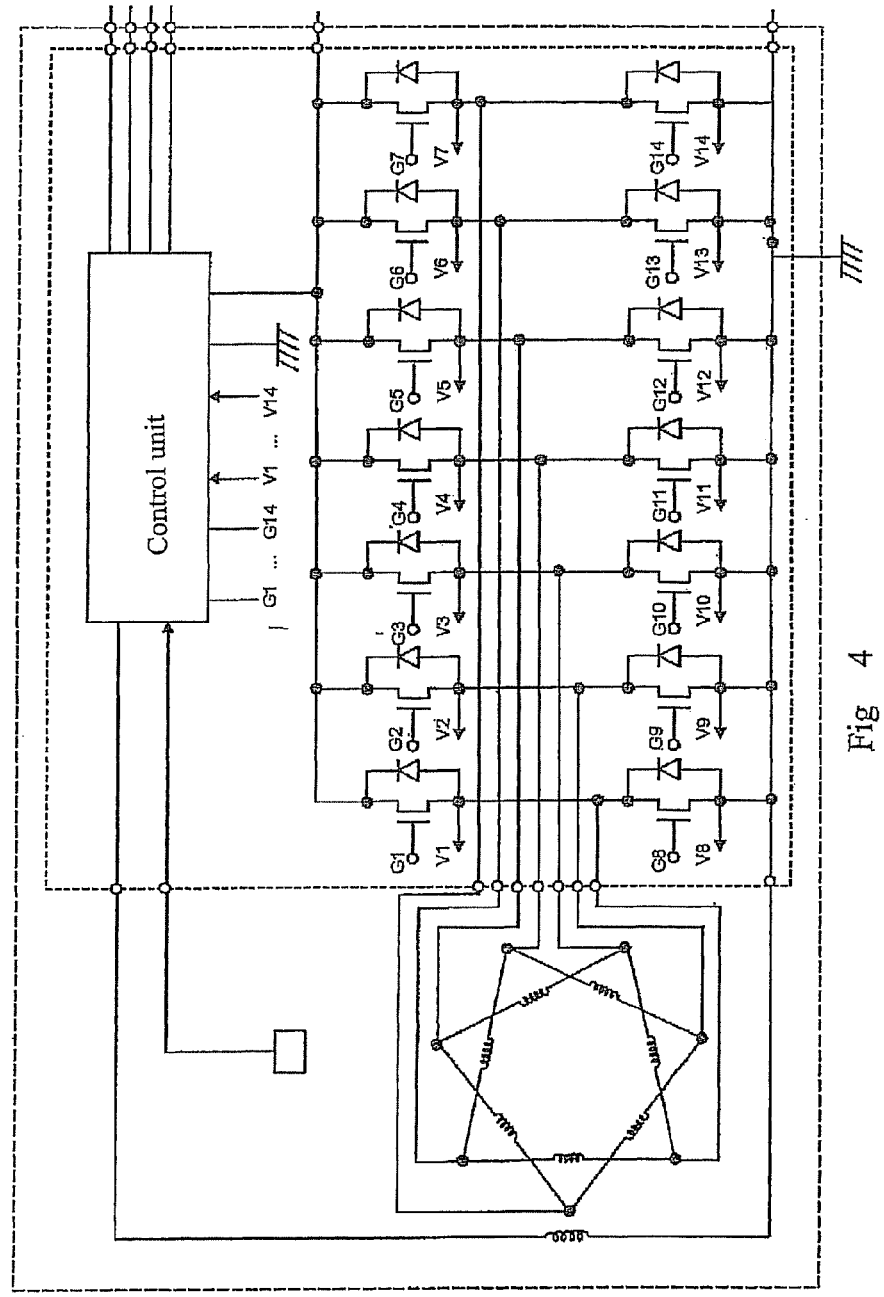
FIG. 4 shows a seven-phase specific embodiment of the engine alternating current generator, connected in a seven-pointed obtuse star.

FIG. 4 shows an advantageous type of connection having seven phase-forming windings.

A design having 2×3 phases, with the independent three-phase systems electrically offset with respect to one another, is also possible as a stator configuration which meets the intended objective.

Figure 5A:
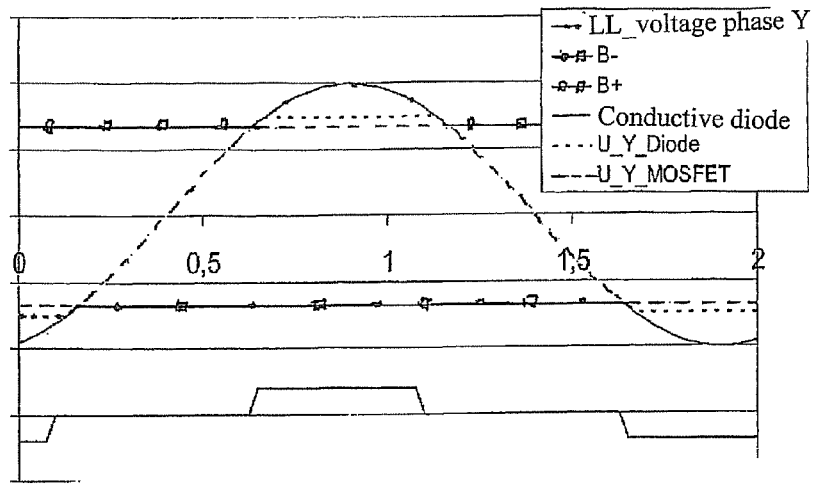
FIG. 5a shows the basic curve of the phase voltage.

FIG. 5a shows the basic curve of the (phase) voltages. The terms have the following meanings:
"LL_voltage phase Y" indicates the theoretical curve for no-load voltage;
"U_Y_diode" indicates the voltage curve when a conventional diode rectifier is used; and
"U_Y_MOSFET" indicates the voltage curve when an ideal switch is used.

Making the switching-off decision is problematic, since in the controlled state the battery voltage is applied to the generator. In addition, it must be taken into account that the switch-off time may continually change due to dynamic changes in the system (rotational speed changes, sudden changes in load, changes in the excitation field).

Figure 5B:
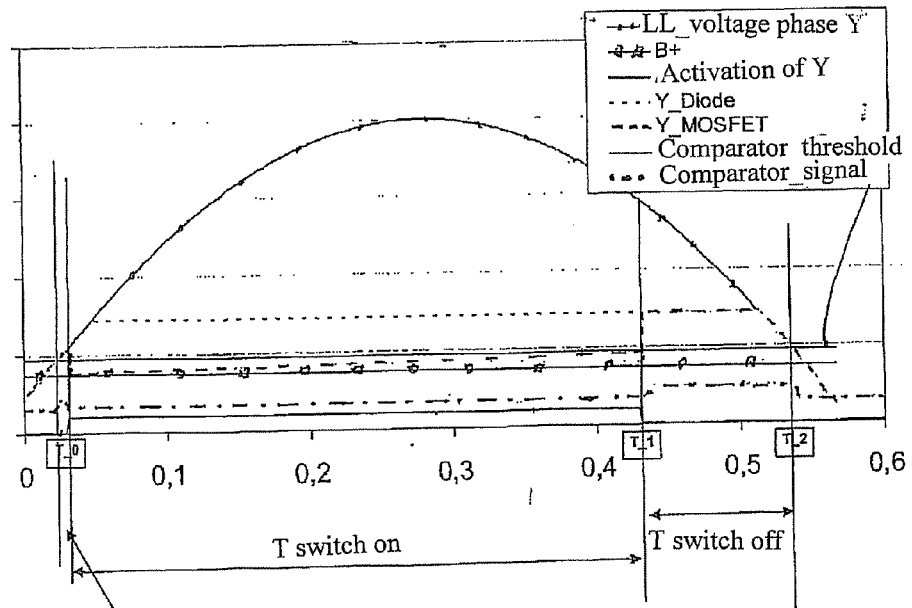
FIG. 5b shows the phase, switch, and diode currents and voltages for activating the switches according to the present invention.

FIG. 5b shows the theoretical curve of the phase no-load voltage with respect to ground. As an example, the detailed view of the upper half-wave is indicated when a comparator between U_BAT and phase Y is used, having a switching threshold of 300 mV.

The terms have the following meanings:
"LL_voltage phase Y" and "B+" denote the curve of the rectified voltage at the terminals of the bridge rectifier. "Activation Y" denotes the signal for activating the switch;
"Y_diode" denotes the theoretical curve of the phase voltage with respect to ground for strictly diode operation without using the switches; and
"Y_MOSFET" denotes the actual curve of the phase voltage with respect to ground at the first moment, while "t diode on" denotes that the voltage increases due to voltage drop Uf across the diode. As soon as the switched-on condition for the MOSFET is sensed, time segment $t_{diode\ on}$ is terminated and time segment $t_{switch\ on}$ begins. During this time segment the voltage phase with respect to ground is only slightly above the generator voltage. At point in time T1 the switch is opened, and the voltage phase with respect to ground increases to the value for diode operation. The diode takes over the current for time $t_{switch\ off}$.

One possible method according to the present invention proceeds as follows:

At point in time T_0 the activation decision may be made based on the recognition by the comparator. The voltage above the switch collapses. The comparator signal goes to "off." At point in time T_1 the control logic system turns the switch off based on a learned pulse-duty factor. The system changes to diode operation, the voltage of the phase exceeds the comparator threshold, and the comparator signal jumps to "on." T_2 is reached as soon as the system commutates off on its own. On the basis of measured time difference T_2-T_1, a controller may be developed for controlled time difference T_2-T_1 which maximizes the active range between T_0 and T_1, and therefore, the efficiency. A characteristic map which is a function of rotational speed n is used as the setpoint setting for T_2-T_1, since in the lower rotational speed range a higher dynamics of the system must be made available. In addition, the length of the active window is a function of the excitation current of the machine. This is achieved by regulating window width T_2-T_1. The aim is for T_2-T_1 never to be zero.

One advantage of the exemplary embodiments and/or exemplary methods of the present invention is reliable recognition of the switch-on and switch-off times of the MOSFET, using only one analog comparator system per switch which is immune to interference. The timing control as well as the regulation to a defined, in particular minimal, time T_2-T_1 may be carried out digitally.

Another main advantage is that an adaptive readjustment of dynamic changes in the system, in particular speed changes, sudden changes in load, changes in the excitation field, etc., are corrected with the aim of achieving maximum performance with minimum susceptibility to interference.

FIG. 6 shows the design of a first specific embodiment of the present invention. In this case a characteristic map is employed which uses rotational speed ng, or rotational speed ng and excitation current IE, or rotational speed ng and excitation current IE and generator voltage UG, or rotational speed ng and excitation current IE and rotational angle phi of the rotor as input variables, and which outputs t switch off setpoint as the output variable. This value is supplied to the controller as a setpoint value.

FIG. 7 illustrates a specific form of the first exemplary embodiment, $t_{switch\ off\ setpoint}$ being computed from a characteristic map having generator rotational speed ng as the input variable. The controller is designed as a PI controller.

Figure 8:
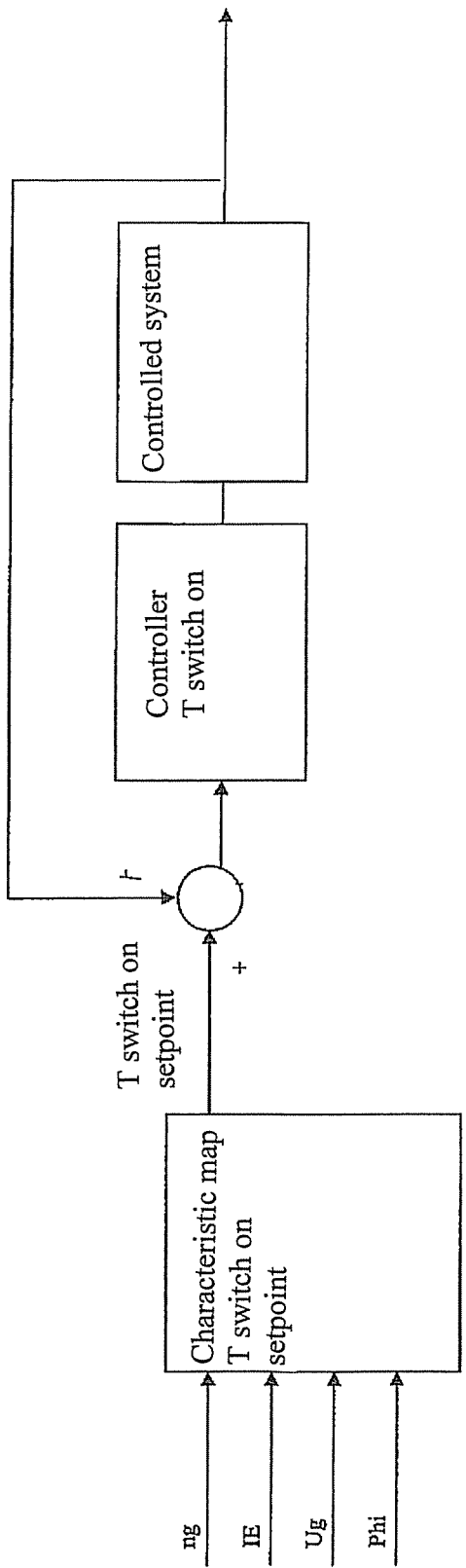

FIG. 8 shows the design of a second specific embodiment of the present invention. In this case a characteristic map is employed which uses rotational speed ng, or rotational speed ng and excitation current IE, or rotational speed ng and excitation current IE and generator voltage UG, or rotational speed ng and excitation current IE and rotational angle phi of the rotor as input variables, and which outputs t switch on setpoint as the output variable. This value is supplied to the controller as a setpoint value.

Figure 9:
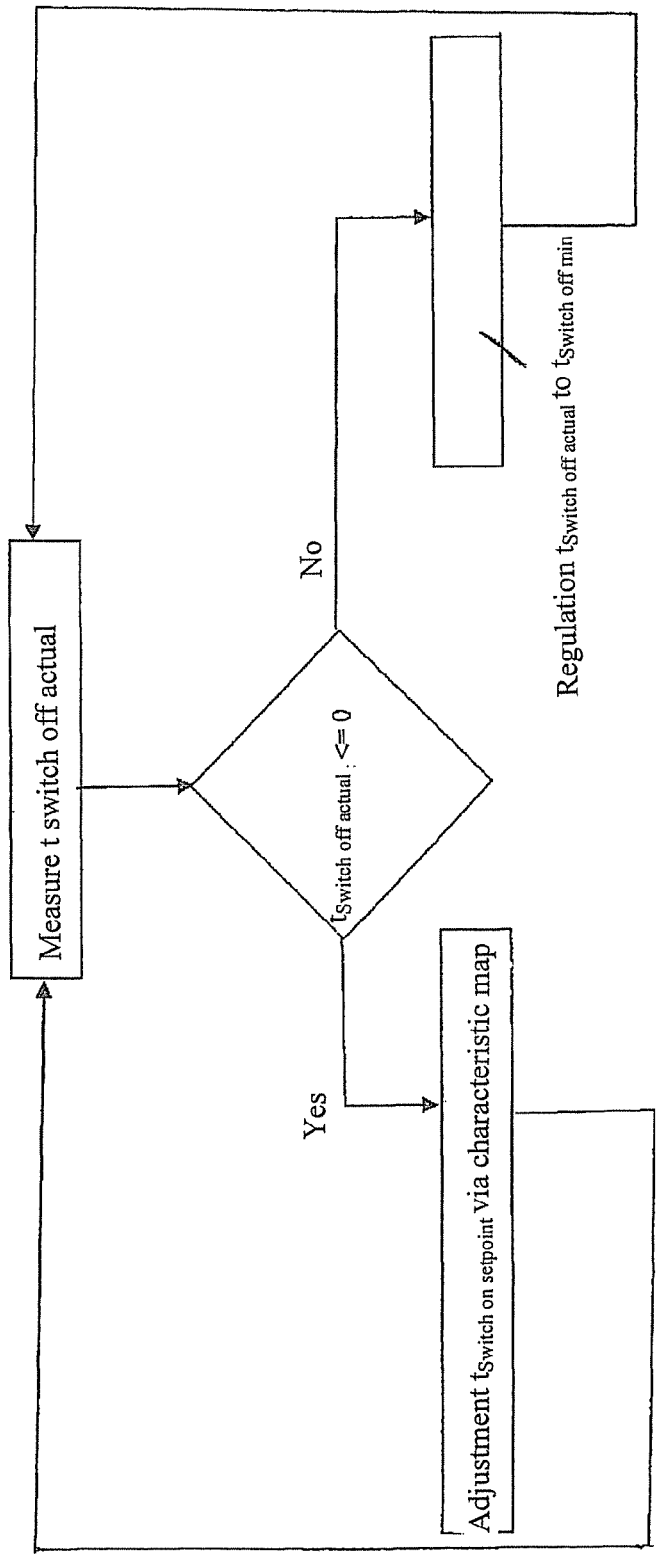
FIG. 9 shows regulation via t switch off.

FIG. 9 shows the principle of a third exemplary embodiment. In this case, time t switch off is measured. If this value is greater than 0, a control algorithm is run which adjusts time $t_{switch\ off}$ to a value $t_{switch\ off\ min}$. Value $t_{switch\ off\ min}$ may be a constant value, or is a percentage of the commutation duration or the duration in the switched-on state. Value $t_{switch\ off}$ is less than or equal to 0.

What is claimed is:

1. A rectifier bridge circuit for rectifying the phase voltage generated by a generator, comprising:
   a positive half-bridge that includes a plurality of rectifier elements and a negative half-bridge that includes a plurality of rectifier elements, wherein:
       the rectifier elements each includes a respective controllable switch and a respective diode connected in parallel to the respective controllable switch; and
       the positive half-bridge and the negative half-bridge are configured to rectify the phase voltage by switching of the switches; and
   a control circuit that is configured to:
       compute at least one of a target switch-on time $t_{switch\ on\ setpoint}$ and a target switch-off time $t_{switch\ off\ setpoint}$ to set a switched-on duration based on a commutation time indicated by at least one monitored operating parameter of the generator; and
       switch the switches on and off in accordance with the at least one of $t_{switch\ on\ setpoint}$ and $t_{switch\ off\ setpoint}$.

2. The rectifier bridge circuit of claim 1, wherein the at least one monitored operating parameter includes a rotational speed ng of the generator.

3. The rectifier bridge circuit of claim 2, wherein the at least one monitored operating parameter further includes a ratio of the switched-on duration to a theoretical maximum switched-on duration, and wherein the theoretical maximum switched-on duration corresponds to the commutation time of the generator.

4. The rectifier bridge circuit of claim 3, wherein the control circuit:
   opens one of the switches to place the respective bridge circuit into a diode operation in which a majority of the current flowing through the respective half-bridge is redirected from the switch to its respective parallel connected diode, and which corresponds to a switched-off duration; and
   ascertains the switched-on duration by measuring the phase voltage at the respective diode during the diode operation.

5. The rectifier bridge circuit of claim 4, wherein the control circuit adjusts the switched-off duration based on the ascertained switched-on duration, such that a subsequent switched-on duration is maximized while maintaining the switched-off duration above zero.

6. The rectifier bridge circuit of claim 2, wherein the at least one monitored operating parameter further includes an excitation current IE.

7. The rectifier bridge circuit of claim 6, wherein the at least one monitored operating parameter further includes a voltage UG of the generator.

8. The rectifier bridge circuit of claim 6, wherein the at least one monitored operating parameter further includes a rotational angle phi of a rotor.

9. The rectifier bridge circuit of claim 1, wherein the at least one monitored operating parameter includes a change in a rotational speed ng of the generator.

10. The rectifier bridge circuit of claim 9, wherein the at least one monitored operating parameter further includes a change in an excitation current IE.

11. The rectifier bridge circuit of claim 10, wherein the at least one monitored operating parameter further includes a change in a voltage UG of the generator.

12. The rectifier bridge circuit of claim 10, wherein the at least one monitored operating parameter further includes a change in a rotational angle phi of a rotor.

13. The rectifier bridge circuit of claim 1, wherein the switch-on time $t_{switch\ on}$ is computed, and the rectifier bridge circuit includes a controller that adjusts an actual switch-on time $t_{switch\ on\ actual}$ towards $t_{switch\ on\ setpoint}$.

14. The rectifier bridge circuit of claim 1, further comprising:
   a controller that adjusts an actual switch-off time $t_{switch\ off\ actual}$ towards $t_{switch\ off\ setpoint}$.

15. The rectifier bridge circuit of claim 14, wherein the controller adjusts $t_{switch\ off\ actual}$ at least one of more rapidly for at least one of a low rotational speed than a higher rotational speed and more rapidly for a small excitation current that a higher excitation current.

16. The rectifier bridge circuit of claim 1, wherein the control circuit sets $t_{switch\ on\ setpoint}$ to zero when $t_{switch\ on\ actual}$ exceeds a theoretical maximum switched-on duration corresponding to the commutation time.

17. The rectifier bridge circuit of claim 1, wherein the computed $t_{switch\ on\ setpoint}$ or $t_{switch\ off\ setpoint}$ values change in response to a given amount of operating parameter change at least one of (a) more rapidly when there exists a smaller excitation current than when there exists a higher excitation current and (b) more rapidly when there exists a lower rotational speed that when there exists a higher rotational speed.

18. The rectifier bridge circuit of claim 1, wherein an actual switch-on time $t_{switch\ on\ actual}$ of a switch is detected using a comparator.

19. The rectifier bridge circuit of claim 18, wherein a forward voltage of the diode is used as an input variable for the comparator, and wherein the switch is detected as being turned on when the diode forward voltage is 0.7V.

20. The rectifier bridge circuit of claim 18, wherein a forward voltage of the diode is used as an input variable for the comparator, and wherein the switch is detected as being turned on when the diode forward voltage is at least 0.35 V.

21. The rectifier bridge circuit of claim 1, wherein the rectifier bridge circuit performs a regulation that minimizes an actual switched-off duration $t_{switch\ off\ actual}$ to a value $t_{switch\ off\ min}$.

22. The rectifier bridge circuit of claim 21, wherein an actual switch-on time $t_{switch\ on\ actual}$ is set towards $t_{switch\ on\ setpoint}$ when $t_{switch\ on\ actual}$ exceeds a theoretical maximum switched-on duration corresponding to the commutation time, and wherein $t_{switch\ off\ setpoint}$ is calculated as a percentage of a total commutation time.

23. The rectifier bridge circuit of claim 1, wherein the at least one monitored operating parameter further includes a ratio of the switched-on duration to a theoretical maximum switched-on duration, and wherein the theoretical maximum switched-on duration corresponds to the commutation time of the generator.

* * * * *